(12) United States Patent
Ibsen et al.

(10) Patent No.: US 9,285,059 B2
(45) Date of Patent: Mar. 15, 2016

(54) CONTROL VALVE

(71) Applicant: FlowCon International ApS, Slagelse (DK)

(72) Inventors: Bjarne Wittendorff Ibsen, Dubai (AE); Carsten Enøe Møller, Slagelse (DK); Lasse Vestergaard Lorenzen, Vemmelev (DK); Mille Sveje Bøjgaard, København Ø (DK)

(73) Assignee: Flowcon International ApS, Slagelse (DK)

( * ) Notice: Subject to any disclaimer, the term of this patent is extended or adjusted under 35 U.S.C. 154(b) by 0 days.

(21) Appl. No.: 14/592,168

(22) Filed: Jan. 8, 2015

(65) Prior Publication Data

US 2015/0198263 A1    Jul. 16, 2015

(30) Foreign Application Priority Data

Jan. 10, 2014    (DK) .................................. 2014 00015

(51) Int. Cl.
*F16K 39/02*    (2006.01)
*G05D 7/01*    (2006.01)

(52) U.S. Cl.
CPC ............ *F16K 39/026* (2013.01); *G05D 7/0113* (2013.01)

(58) Field of Classification Search
CPC ............. F16K 15/18; F16K 3/24; F16K 3/26; F16K 3/32; F16K 37/0016; F24D 19/1015; G05D 7/0113

USPC .................................................... 137/625.17
See application file for complete search history.

(56) References Cited

U.S. PATENT DOCUMENTS

| | | | | |
|---|---|---|---|---|
| 5,983,826 | A * | 11/1999 | Lohde ........................... | 116/277 |
| 2007/0262279 | A1 * | 11/2007 | Marstorp et al. .............. | 251/118 |
| 2008/0245428 | A1 * | 10/2008 | Jorgensen .................... | 137/627.5 |
| 2009/0321672 | A1 * | 12/2009 | Ibsen et al. ................... | 251/207 |
| 2011/0068284 | A1 * | 3/2011 | Jorgensen ..................... | 251/46 |
| 2011/0186147 | A1 * | 8/2011 | Rasmussen ............. | 137/315.04 |
| 2013/0261813 | A1 * | 10/2013 | Ibsen et al. ................... | 700/282 |

FOREIGN PATENT DOCUMENTS

| | | |
|---|---|---|
| DK | 200100281 | 8/2002 |
| WO | WO9517622 | 6/1995 |
| WO | WO2013007633 | 1/2013 |

* cited by examiner

*Primary Examiner* — Craig Schneider
*Assistant Examiner* — Kevin Barss
(74) *Attorney, Agent, or Firm* — K. David Crockett, Esq.; Niky Economy Syrengelas, Esq.; Crockett & Crockett, PC (57) ABSTRACT

A control valve for controlling liquid flow in a heating and/or cooling installation. The control valve includes differential pressure regulating facilities and flow area regulating facilities. The control valve is provided with means for manually presetting a maximum flow through area and with means for automatically adjusting the flow through area within the preset maximum.

17 Claims, 6 Drawing Sheets

CONTROL VALVE

CROSS-REFERENCE TO RELATED APPLICATIONS

This application claims the benefit of priority of Danish patent application No. PA2014 00015 filed on Jan. 10, 2014, the contents of which are incorporated herein by reference for all purposes.

TECHNICAL FIELD

The present inventions relate to a control valve for controlling liquid flow in a heating and/or cooling installation, in particular a control valve with a flow area regulator for regulating a flow area of at least one variable size entry opening and with a pressure regulating arrangement downstream of the flow area regulator with a pressure chamber between the flow area regulator and the pressure regulating arrangement.

BACKGROUND ART

WO 2013/007633 discloses a control valve for controlling liquid flow in a heating and/or cooling installation under command from an actuator. The control valve comprises a flow regulator with two annular valve members that have an axial overlap. The one valve member is manually rotatable relative to the second valve member. The axially overlapping portions of the valve members define an entry opening with a variable circumferential extent. A third valve member is axially displaceable by the actuator relative to the opening and defines a control edge associated with the opening. Rotation of the first valve member relative to the second valve member changes the circumferential extent of the opening, in order to manually preset a maximum through-flow area. Axial displacement of the third valve member changes the axial extent of the through-flow area of the entry opening, in order to regulate the through-flow area within a range limited by the preset maximum. A differential pressure regulator is provided downstream of the flow regulator, with a pressure chamber arranged between the flow regulator and the differential pressure regulator and it regulates the differential pressure across the entry opening, i.e. the pressure difference between the inlet pressure and the intermediate pressure in the pressure chamber. The exit openings of the differential pressure regulator connect to the outlet of the control valve.

The control valve disclosed in WO 2013/007633 has the advantage that it adjusts itself automatically to a preset flow in order to provide full stroke modulating control by an actuator that acts on the control valve. When the operator presets the valve according to a maximum design flow, the stroke of the third valve member and thus the stroke of the control valve remains the same.

However, control valves like disclosed in WO 2013/007633 have a flow regulator, which closes off very efficiently and have a differential pressure regulator, which in response to the flow regulator closing off simultaneously tries to close off the exit openings when the actuator closes the flow regulator. This has the drawback that an excessive amount of water can be trapped in the pressure chamber between the flow regulator and the differential pressure regulator and this trapped volume of water can in some circumstances obstruct the closing movement of one or the other or both regulators in turn.

SUMMARY

It is an object of the invention to overcome or at least reduce the problems and/or drawbacks associated with the prior art control valves.

This object is achieved by providing a control valve for controlling liquid flow in a heating and/or cooling installation, the control valve comprising a valve housing with an inlet and an outlet, a flow area regulator for regulating a flow area of at least one variable size entry opening through which the liquid flowing through the control valve from the inlet to the outlet has to pass, the flow regulator comprising at least one valve member that is movable between a fully open position that corresponds to a largest possible flow area of the opening and a fully closed position that corresponds to the smallest possible flow area of the opening, in which the opening is essentially closed, a pressure regulating arrangement downstream of the flow area regulator with a pressure chamber downstream of the flow area regulator and upstream of the pressure regulating arrangement, the pressure regulating arrangement being configured for maintaining an essentially constant differential pressure between the inlet pressure in the inlet and the intermediate pressure in the pressure chamber the pressure regulating arrangement comprising a movable throttle member that cooperates with a plurality of exit openings, the movable throttle member substantially closes the exit openings in one of its positions, characterized by comprising at least one drain passage connecting the pressure chamber to the outlet, with the drain passage still allowing liquid in the pressure chamber to drain to the outlet when the movable throttle member is in the position where it closes the exit openings.

By providing a drain passage that allows the liquid in the pressure chamber to drain to the outlet of the control valve when the movable throttle member is in the position where it closes the exit openings the flow area regulator can be closed and the pressure regulating arrangement can move towards its closed position, without any counteractions of liquid trapped in the control valve.

In an embodiment the pressure regulating element comprises a movable throttle member that is urged by the inlet pressure to increase the flow resistance posed by the pressure regulating arrangement and that is urged by a resilient member and by the intermediate pressure to decrease the flow resistance posed by the pressure regulating arrangement.

In an embodiment the movable throttle member comprises a rolling diaphragm that cooperates with a plurality of exit openings.

In an embodiment the control valve further comprises an annular valve member in which the rolling diaphragm is received, the annular valve member at least partially defining the pressure chamber and the exit openings being provided in the annular valve member and circumferentially distributed around the circumference of the annular valve member.

In an embodiment the at least one drain passage connects to the outlet via one or more of the exit openings.

In an embodiment the rolling diagram substantially closes the exit holes in a position of the rolling diagram with the drain passage still allowing liquid in the pressure chamber to drain to the outlet.

In an embodiment the drain passage includes at least one groove in the inner wall of the annular valve member, the at least one groove preferably connecting to one of the exit openings.

In an embodiment the exit openings are elongated holes though the annular valve member, and wherein the at least one drain passage is a substantially axially extending groove in the inner wall of the annular valve member that connects to one of the exit openings.

In an embodiment the control valve further comprises a rotatable and/or axially displaceable valve member that cooperates with the annular valve member to define and regulate the size of the flow area of the entry opening.

In an embodiment a rotatable valve member is configured to adjust the circumferential extent of the entry opening in cooperation with the annular valve member.

In an embodiment an axially displaceable valve member is configured to adjust the axial extent of the entry opening in cooperation with the annular valve member and/or with the rotatable valve member.

In an embodiment the rotatable valve member is configured to be manually adjusted in its rotational position.

In an embodiment the axially displaceable valve member is configured to be adjusted in its axial position by an actuator.

In an embodiment the axially displaceable valve member comprises at least one control edge.

In embodiment the rotatable valve member is operably connected to an axial valve stem so that rotation of the valve stem results in rotation of the rotatable valve member and the valve stem has a marker secured thereto, the marker being configured to indicate the position of the first valve member on a fixed angular scale that is provided on the axial end of the housing.

In embodiment the rotatable valve member is operably connected to an axial valve stem so that rotation of the valve stem results in rotation of the rotatable valve member and the valve stem or the rotational valve member has an angular scale attached thereto or included therein, configured so that a fixed marker can indicate the position of the first valve member.

The object above is also achieved by providing a control valve for controlling differential pressure in a heating and/or cooling installation, the control valve comprising a valve housing with an inlet, an outlet and a control port, a pressure regulating arrangement with a pressure chamber upstream of the pressure regulating arrangement, the pressure regulating arrangement being configured for maintaining an essentially constant differential pressure between a control pressure provided via the control port and an intermediate pressure in the pressure chamber, the pressure regulating arrangement comprises a diaphragm, preferably a rolling diaphragm, that cooperates with a plurality of exit openings, the rolling diaphragm is urged by the control pressure to increase the flow resistance posed by the pressure regulating arrangement to liquid flow from the inlet to the outlet and that is urged by a resilient member and by the intermediate pressure to decrease the flow resistance posed by the pressure regulating arrangement to liquid flow from the inlet to the outlet the diaphragm closes the exit openings in one of its positions, further comprising at least one drain passage connecting the pressure chamber to the outlet, with said drain passage (54) still allowing liquid in said pressure chamber (8) to drain to said outlet (4) when said diaphragm (47) is in said position where it closes said exit openings (43).

By providing a drain passage that allows the liquid in the pressure chamber to drain to the outlet of the control valve the flow area regulator can be closed and the pressure regulating arrangement can move towards its closed position, without any counteractions of liquid trapped in the control valve.

Further objects, features, advantages and properties of the control valve according to the disclosure will become apparent from the detailed description.

BRIEF DESCRIPTION OF THE DRAWINGS

In the following detailed portion of the description, the invention will be explained in more detail with reference to the exemplary embodiments shown in the drawings, in which.

DETAILED DESCRIPTION OF PREFERRED EMBODIMENTS

Example embodiments of the invention will now be described with reference to the drawing figures, in which like reference numerals refer to like parts throughout.

The control valve 1 is in an example embodiment of a regulator valve that includes differential pressure regulating facilities and flow area regulating facilities. Preferably the control valve is provided with means for manually presetting a maximum flow through area and with means for automatically adjusting the flow through area within the preset maximum. The flow regulation is tightly connected with the differential pressure regulation. Thus, the actual regulation in the parts referred to as the flow regulation facilities or the flow regulator is "only" a regulation of the size of the through-flow area. The combination of the carefully controlled through-flow area and the differential pressure across it, results in the actual flow regulation.

FIGS. 1 to 7 illustrate an example embodiment of a control valve 1 for use in a heating or cooling plant. In this embodiment the control valve 1 has a valve housing 2. The valve housing 2 is in an embodiment made from a suitable metal alloy, such as e.g. bronze (including gunmetal), brass (including corrosion-resistant and dezincification resistant brass, DZR or DR), ductile iron or steel (including stainless steel) and can be manufactured by a suitable molding technique such as hot pressing, die casting or forging. The valve housing 2 is provided with an inlet 3 and an outlet 4. Both the inlet 3 and outlet 4 are provided with internal or external (not shown) threads or other connection facilities, such as press end connections, for connection to pipes of a heating or cooling plant.

The valve housing 2 is a hollow and essentially cylindrical body with open axial ends and with the inlet 3 and outlet 4 on opposite sides of the cylindrical body and opening to the pressure chamber 8 in the hollow in the valve housing. The axial ends of the valve housing 2 are closed by a head nut 6 that is fitted to the upper (upper as in the orientation depicted in FIG. 1) axial end and an integral end cap 7 at the opposite axial end. Both the head nut 6 and the end cap 7 are secured to the housing. An O-ring 21 seals the head nut 6 to the valve housing 2.

The head-nut 6 is provided with a fastening feature (including options of a threaded collar 14 or a snap fit locking mechanism (not shown)) that allows an actuator 60 (shown in FIG. 3) to be attached to the top of the control valve 1. The actuator 60 is preferably a thermal or electrical actuator.

A rotatable valve stem 12 protrudes from the inner parts of the valve. The rotatable valve stem 12 can be rotated about the central axis X of the control valve 1. In an embodiment the valve stem 12 is an integral part of a first rotatable valve member 20 and in an embodiment the valve stem 12 and the first valve member 20 are part of a single molded item.

A marker 15 is fixed on the/to the housing 2 and/or the head nut 6. An angular scale 16 is attached to or part of the valve stem 12 and/or the first valve member 20 to indicate the angular position of the marker 15 and thereby of the valve stem 12 and the first valve member 20. Other arrangements for indicating the position of the valve stem 12 can be used instead.

An axially displaceable pin 10 is received concentrically in an axial bore in the valve stem 12. The actuator 60 acts on the pin 10.

A valve insert comprises the first valve member 20, a second valve member 40 and a third valve member 24, and is inserted into the hollow interior 8 of the valve housing 2. In an embodiment the valve members 20,24,40 are made mainly from a plastic material (polymer material). In an embodiment the first valve member 20 is arranged to be rotatable relative to the second valve member 40 and the housing 2. In an embodiment the second valve member 40 is stationary relative to the housing 2. The first valve member 20 has an essentially annular shaped body. The valve stem 12 is operatively connected to the first valve member 20 so that the latter rotates in unison with the valve stem 12. The annular body of the first valve member 20 has a certain axial extent and is provided with a preferably oblong through-flow opening 25 with a circumferential extent larger than its axial extent.

Figure 6:
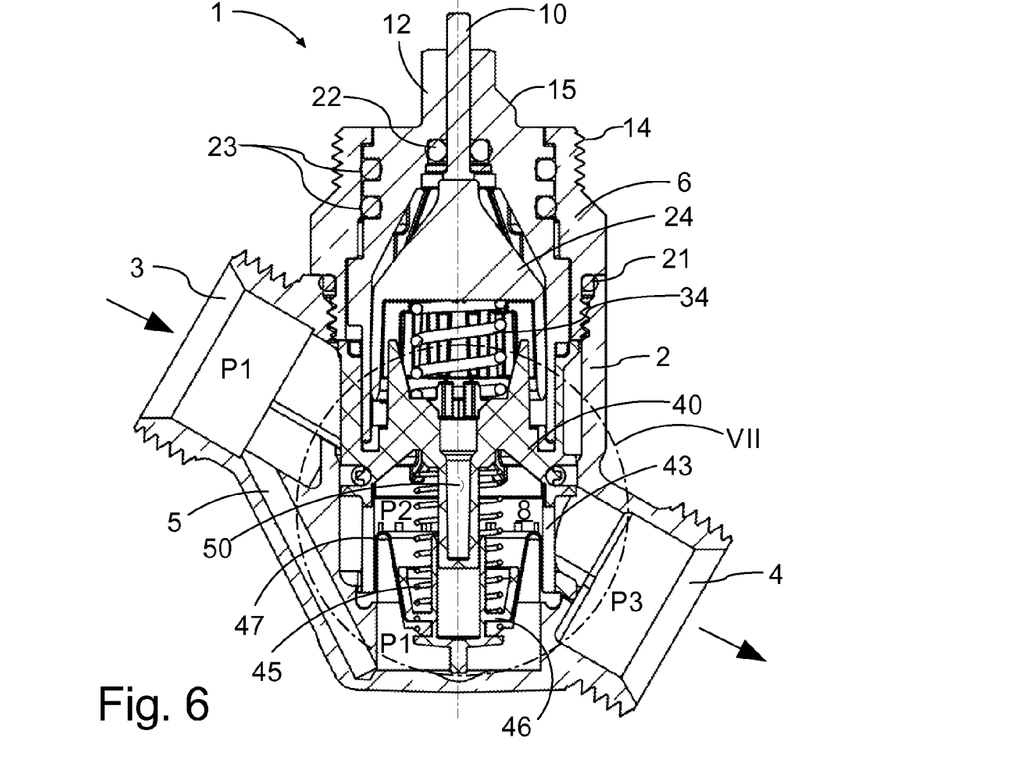
FIG. 6 is a sectional view of the control valve of FIG. 1.
Figure 7:
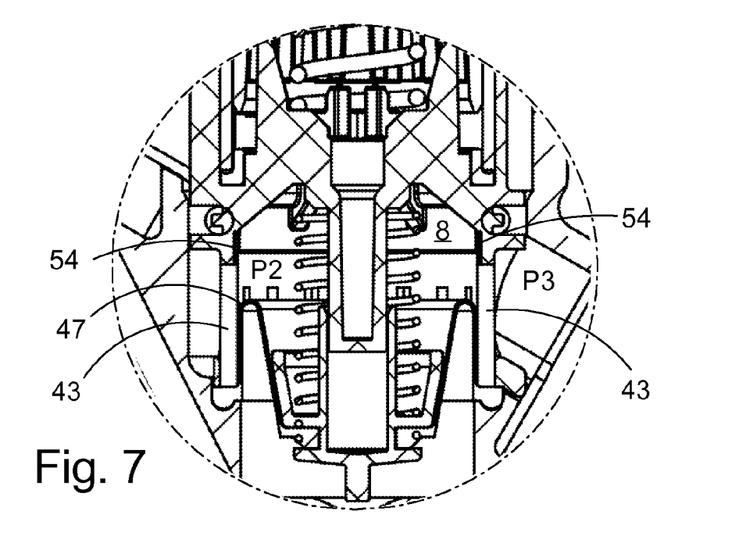
FIG. 7 is an enlarged view of section VII indicated in FIG. 6.

O-rings 23 seal valve first valve member to the head nut 6. The pin 10 extends through the stem 12 into the upper (upper as in FIG. 4/6) part of the first valve member 20. An O-ring 22 seals the pin 10 to the upper part of the first valve member 20. The lower (lower as in FIG. 4/6) extremity of the pin 10 engages the upper extremity of a (upper as in FIG. 4) of the axially displaceable third valve member 24.

The third valve member 24 is received axially displaceable inside a portion of the first valve member 20. The second valve 40 member has an essentially annular body, i.e. like a hollow cylinder. The lower portion of the first valve member 20 is received inside the upper annular portion of the second valve member 40. Thus, an annular portion of the second valve member 40 has an axial overlap with the annular portion of the first valve member 20. The overlapping portions of the first and second valve members 20, 40 can be penannular (forming an almost complete ring) instead of annular.

A helical wire spring 34 is disposed between the third valve member 24 and the second valve member 40. The helical wire spring 34 urges the third valve member 24 upwards towards the pin 10 and the actuator 60.

An O-ring 44 seals the second valve member 40 to the inner wall of the valve housing 2 for dividing the valve housing 2 in an inlet part with a fluid pressure P1 corresponding to the pressure at the inlet 3 and an outlet part with a pressure P3 corresponding to the pressure at the outlet 4. A Pressure communication channel 5 communicates the pressure P1 at the inlet 3 to the bottom end of the valve housing 2.

A seal 38 to the top of the second valve member 40 enables a perfect seal between the second valve member 40 (and thus the housing 2) and the control edge 26 of third valve member 24. This enables the actuator 60 to close off the valve 1 completely, so that no leak can occur between the inlet 3 (P1) on one side and the middle part 8 (P2) and outlet 4 (P3) on the other side. In an embodiment P2 is the pressure downstream of the arrangement for adjusting the flow area and upstream of the arrangement for the differential pressure regulation.

An axially displaceable diaphragm guide 46 has a hollow upwardly projecting stem in which a downwardly projecting guiding shaft 50 of the second valve member 40 is received. The diaphragm guide 46 supports and guides a diaphragm 47. A helical wire spring 45 is disposed between the second valve member 40 and the diaphragm guide 46 to urge the diaphragm guide 46 in a downward direction as a countermeasure to the force respectively from P1, which influences the diaphragm 47 and diaphragm guide 46 in an upward direction and from P2, which influences the diaphragm 47 and diaphragm guide 46 in a downward direction. The second valve member 40 is provided with a plurality of preferably elongated and axially directed exit openings 43. The exit openings 43 are distributed around the circumference of the second valve member 40 at an axial position that approximately corresponds to the axial range of the diaphragm 47. Thus, the arrangement including the diaphragm 47 and the exit openings 43 maintains an essentially constant differential pressure between the inlet pressure P1 and the intermediate pressure P2.

The diaphragm 47 closes the exit openings 43 to greater or lesser extent. A higher (higher as e.g. in FIGS. 4 and 6) position of the diaphragm 47 and diaphragm guide 46 results in a lesser extent of the elongated exit openings 43 being open and a lower position of the diaphragm 47 and diaphragm guide 46 results in a larger extent of the exit openings 43 being open.

The portion of the rotatable stem 12 that protrudes from the valve housing 2 is configured to be engaged by a detachable handle or key (not shown). Hereto, the upper portion of the valve stem 12 is provided with a noncircular cross-section, in an embodiment this is a squared cross-sectional shape that matches a key with a recess with a squared cross-sectional shape.

The first rotatable valve member 20 is provided with an oblong through-flow opening 25 in its annular or penannular part. The circumferential extent of the through-flow opening 25 is in this example embodiment approximately 180° but could be lesser or more in other embodiments. A reinforcing rib 35 extends across the first through-flow opening 25 in order to reinforce and stabilize the first valve member 20.

The axially displaceable third valve member 24 can be provided with radial reinforcement ribs 33 that attach to a central shaft and with a control edge 26.

The stationary second valve member 40 is provided with an oblong through-flow opening 41.

The circumferential extent of the first through-flow opening 41 is in this example embodiment approximately 180° but could be lesser or more in other embodiments. The first through-flow opening 41 is provided with reinforcing ribs 39.

The through-flow opening 25 in the first valve member 20 and the through-flow opening 41 in the second valve member 40 overlap completely in the axial direction and have a preferably substantially identical axial extent.

The rotational position of the first valve member 20 relative to the second valve member 40 determines the overlap between the through-flow opening 25 in the first valve member 20 and the through-flow opening 41 in the second valve member 40. In an extreme rotational position of the first valve member 20 relative to the second valve member 40 there is no overlap between the opening 25 in the first valve member 20 and opening 41 in the second valve member 40. Thus, in an extreme position control valve 1 is essentially closed for through-flow and this is indicated by the marker 15 indicating position "1" on the angular scale 16.

When the rotational position of the first valve member 20 relative to the second valve member 40 is moved to an intermediate position there is an overlap between the through-flow opening 25 in the first valve member 20 and the through-flow opening 41 in the second valve member 40 that results in an opening with a circumferential extent equal to half the circumferential extent of the first through-flow opening 41, i.e. approximately 90°.

When the rotational position of the first valve member 20 relative to the second valve member 40 is at its other extreme position a complete overlap between the through-flow opening 25 in the first valve member 20 and the through-flow opening 41 in the second valve member 40. This results in an entry opening with a circumferential extent equal to the circumferential extent of the first through-flow opening 41, i.e. approximately 180°. In this rotational position of the first valve member 20 the entry openings formed by the overlap in the through-flow openings in the first and second valve members 20, 40 are preset to their maximum possible flow-through area. This is reflected by the rotatable marker 15 indicating position "5", i.e. the fully open position with the control valve 1 being set to its highest maximum flow range.

The axial position of the third valve member 24 is completely independent from the rotational position of the first valve member 20.

The valve 1 is in an embodiment a self-balancing dynamic flow control valve that is pressure independent, with an actuator 60 that is controlled by an input signal or by ambient temperature. The amount of liquid flowing through the control valve 1 is determined by an adjustable throttling element, which is in an embodiment formed as an adjustable orifice formed by the inlets created by the overlap between the first, second and third valve members 20,40,24.

The angular position of the rotatable first valve member 20 determines the maximum flow area of the adjustable orifice as formed by the two entry openings. The position of the rotatable first valve member 20 and thus of the valve stem 12 has to be set accurately so the operator knows exactly the maximum flow for the chosen setting.

The position of an axially displaceable shaft or pin 10 that is concentric with the valve stem 12 and protrudes from the valve stem 12 determines the axial flow area of the throttling element/adjustable orifice (entry opening) in the control valve 1 between a minimum value and the maximum set value determined by the position of the rotatable valve member 20.

The axially displaceable pin 10 is operably connected to the actuator 60 so that the position of the axially displaceable pin 10 and the third valve member can be controlled with a control signal to the actuator 60, or by ambient temperature.

The maximum flow area is manually set by an operator when the actuator 60 is dismounted from the control valve 1 and the valve stem 12 can be accessed. The shape and size of the valve stem 12 and the torque required to rotate the valve stem 12 is such that it is not possible for an operator to adjust the position of the rotatable valve member 20 without the use of a suitable tool. For this purpose a detachable handle or key (not shown) is provided. The detachable key is detachably coupled to the valve stem 12 and the key provides an operator with enough leverage to adjust the position of the rotatable valve member 20.

In operation, fluid, such as cold or warm water arrives at the inlet 3 with a pressure level P1. This water flows through the entry opening defined by the overlap between the through-flow openings 25,41, into the pressure chamber 8. The entry opening acts as a restriction and therefore the pressure P2 in the pressure chamber 8 of the control valve 1 is lower than pressure P1. The pressure of the liquid in the pressure chamber 8 of the control valve urges the diaphragm 47 downwards, together with the helical wire spring 45. Pressure P1 is communicated via the pressure communication channel 5 to the opposite side of the diaphragm 47 and urges the diaphragm 47 upwards. The balance of these forces determines the position of the diaphragm 47 and thereby the differential pressure across the openings/adjustable orifice. Since the diaphragm 47 and the exit openings 43 act as a restriction to the flow the pressure P3 in the outlet 4 is generally lower than pressure P2.

When the axially movable valve member 24 is pressed completely downwards, e.g. by the linear actuator 60 and abuts with the seal 36 the flow regulator is essentially completely closed. This will eventually cause the pressure P2 in the pressure chamber 8 to adopt the pressure P3 at the outlet 4. Since the inlet pressure P1 is much higher than the pressure P2 the diaphragm guide 46 and the diaphragm 47 will be urged upwards against the force of the spring 47 thereby closing the exit openings 43. However, when the exit openings 43 are practically closed by the diaphragm 47, the remaining liquid in the pressure chamber 8 is trapped. A drain passage 54 that connects the pressure chamber 8 to the outlet 4 allows the excessive liquid in the pressure chamber 8 to drain to the outlet 4. This allows simultaneously closing of the exit openings by the third valve member and of the openings 43 by the diaphragm 47. In an embodiment the drain passage 54 includes one or more grooves that are provided on the inner wall of the second valve member 40. In an embodiment, the groove 54 extends axially and one end of the groove connects to one of the exit openings 43, preferably at the upper end of the exit opening. Thus, a drain passage 54 is established by the groove and the associated exit opening 43.

Figure 8:
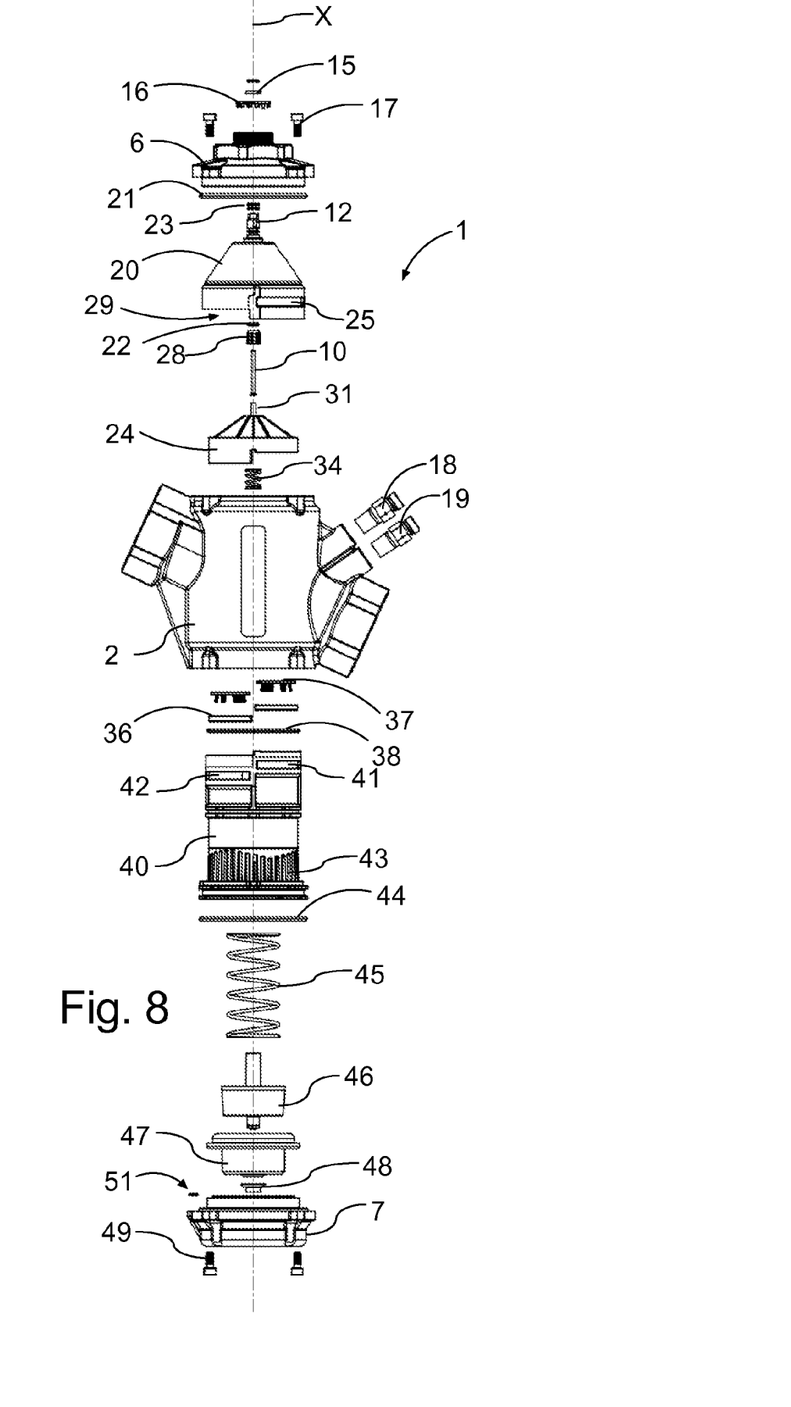
FIG. 8 is an exploded view of a control valve according to another embodiment.
Figure 9:
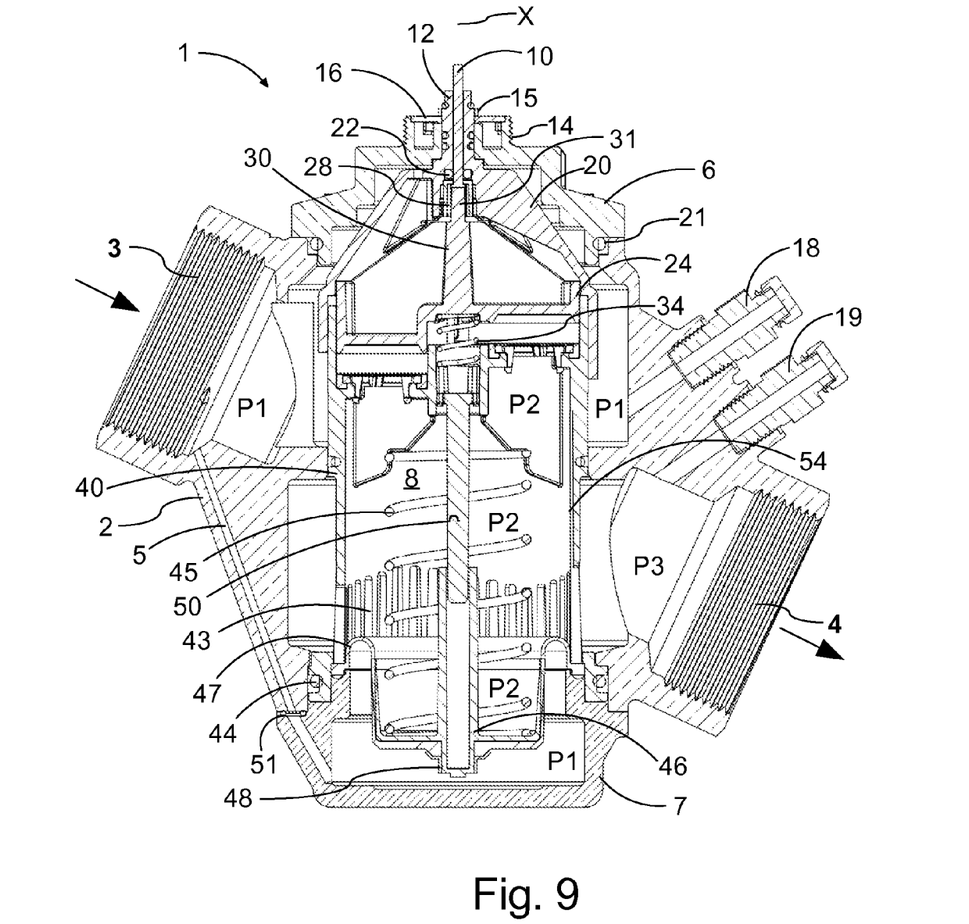
FIG. 9 is a sectional view of the control valve of FIG. 8, FIGS. 10 and 11 are views of a valve according to another example embodiment.

FIGS. 8 and 9 illustrate another example embodiment of a control valve 1 for use in a heating or cooling plant. In this embodiment the control valve 1 has a valve housing 2. The valve housing 2 is in an embodiment made from a suitable metal alloy, such as e.g. bronze (including gunmetal), brass (including corrosion-resistant and dezincification resistant brass, DZR or DR), ductile iron or steel (including stainless steel) and can be manufactured by a suitable molding technique such as hot pressing, die casting or forging. The valve housing 2 is provided with an inlet 3 and an outlet 4. Both the inlet 3 and outlet 4 are provided with internal or external (not shown) threads or other connection facilities, such as press end connections, for connection to pipes of a heating or cooling plant.

The valve housing 2 is a hollow and essentially cylindrical body with open axial ends and with the inlet 3 and outlet 4 on opposite sides of the cylindrical body and opening to a pressure chamber 8 in the hollow of the valve housing. The axial ends of the valve housing 2 are closed by a head nut 6 that is fitted to the upper (upper as in the orientation depicted in FIG. 1) axial end and an end cap 7 secured to the opposite axial end. Both the head nut 6 and the end cap 7 are secured to the housing (including possible fastening features such as locking screws 17,49 or that the inside of the housing and the outside of respectively the head nut 6 and the end cap 7 is threaded). An O-ring 21 seals the head nut 6 to the valve housing 2 and an O-ring 51 seals the end cap 7 to the valve housing 2 and a bulge on the diaphragm seals the end cap 7 to the second valve member 40, which is sealed to the housing by O-ring 44.

The valve housing 2 can be provided with P/T plugs 18,19 for pressure and/or temperature sensors of the like or for de-aeration equipment.

The head nut 6 is provided with a fastening feature (including options of a threaded collar 14 or a snap fit locking mechanism (not shown)) that allows an actuator 60 (shown in FIG. 3) to be attached to the top of the control valve 1. The actuator 60 is preferably a thermal or electrical actuator.

A rotatable valve stem 12 protrudes from the inner parts of the valve. The rotatable valve stem 12 can be rotated about the central axis X of the control valve 1. In an embodiment the valve stem 12 is an integral part of the first valve member 20 and in an embodiment the valve stem 12 and the first valve member 20 are part of a single molded item.

A marker 15 is secured to the rotatable valve stem 12 and rotates in unison therewith. The valve is provided with a fixed angular scale 16 to indicate the angular position of the marker 15 and thereby of the valve stem 12 and the second valve member 20.

An axially displaceable pin 10 is received concentrically in an axial bore in the valve stem 12. The actuator 60 acts on the pin 10.

A valve insert comprises the first valve member 20, a second valve member 40 and a third valve member 24 is inserted into the hollow interior 8 of the valve housing 2. In an embodiment the valve members 20,24,40 are made from a plastic material (polymer material). In an embodiment the first valve member 20 is arranged to be rotatable relative to the second valve member 40 and the housing 2. In an embodiment the second valve member 40 is stationary relative to the housing 2. The first valve member 20 has an essentially frustoconical shaped portion and an essentially annular shaped portion. The valve stem 12 is operably connected to the frustoconical shaped portion so that the first valve member 20 rotates in unison with the valve stem 12. The annular portion of the first valve member 20 has a certain axial extent and this portion is provided with a preferably oblong through-flow opening 25 with a circumferential extent larger than its axial extent.

Figure 1:
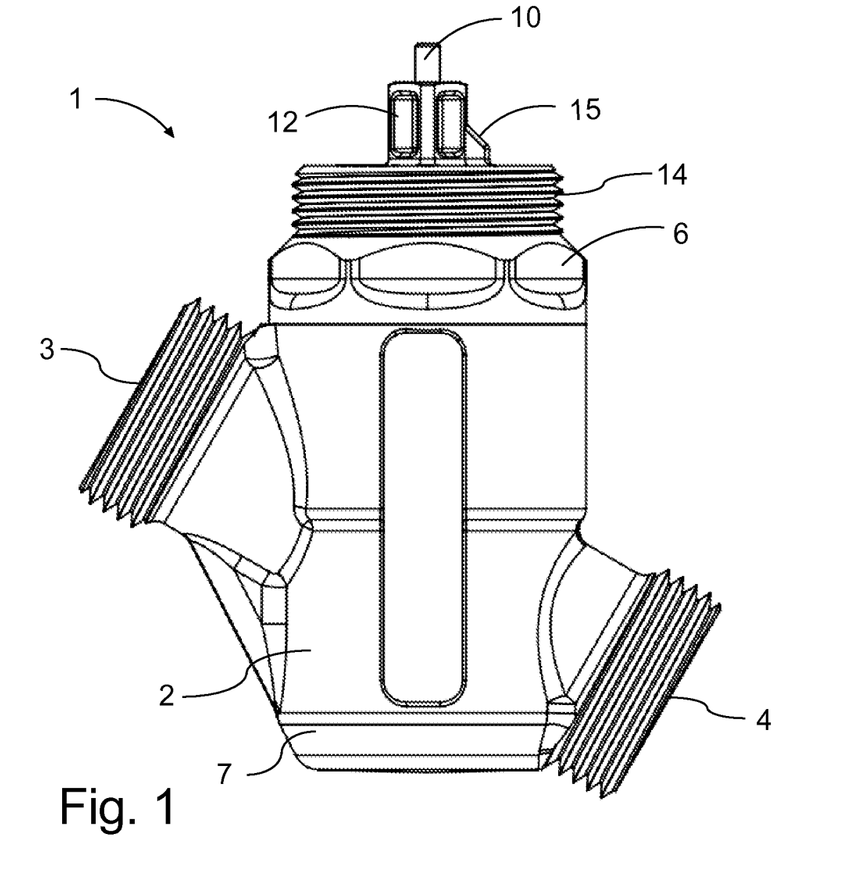
FIG. 1, is a side view of a control valve according to an example embodiment.
Figure 2:
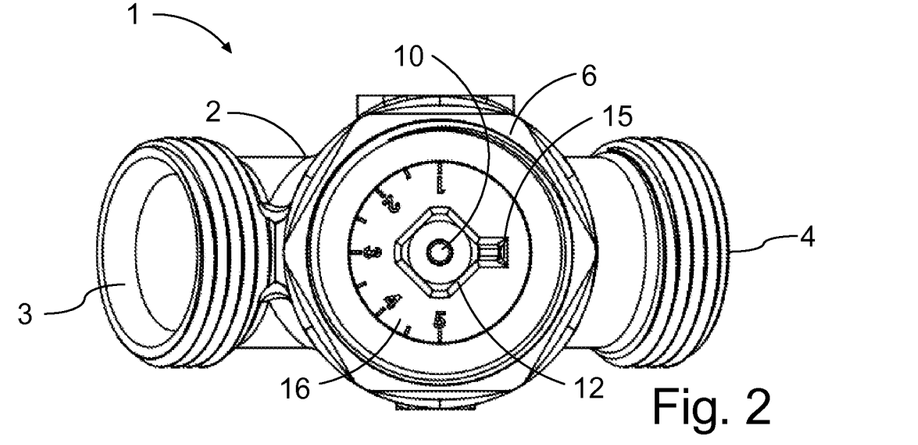
FIG. 2 is a top view of the control valve of FIG. 1.
Figure 3:
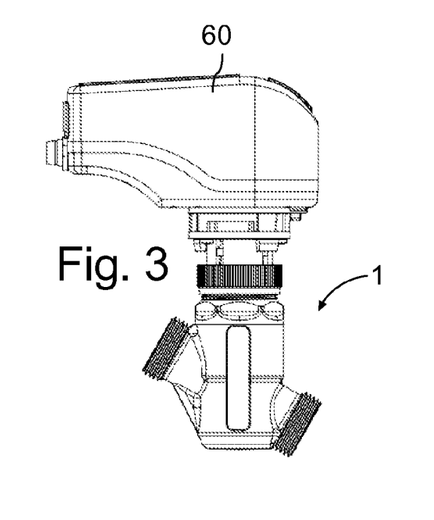
FIG. 3 is a side view of the control valve of FIG. 1 with an electronic actuator fitted thereto.
Figure 4:
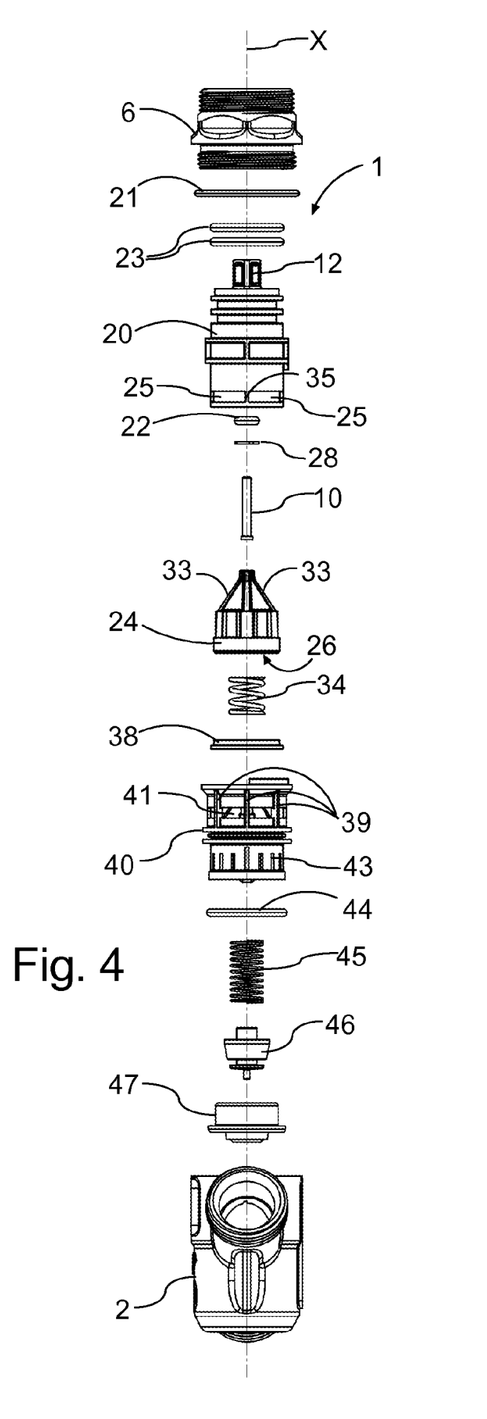
FIG. 4 is an exploded (front) view of the control valve of FIG. 1.
Figure 5:
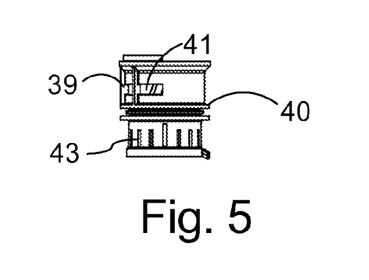
FIG. 5 is a side view of the second valve member.

O-rings 23 seal valve stem 12 to the head nut 6. The top of the frustoconical portion of the first valve member 20 abuts with the inner side of the head nut 6. The pin 10 extends through the stem 12 into the upper (upper as in FIG. 4/5) part of the first valve member 20. An O-ring 22 seals the pin 10 to the upper part of the first valve member 20. The lower (lower as in FIG. 4) extremity of the pin 10 engages the upper extremity of a pin 31 projecting upwardly (upwardly as in FIG. 4) from the axially displaceable third valve member 24. A preferably plastic material (polymer) locking part 28 is received in a recess in the rotatable first valve member 20. The locking part 28 has a through-going bore through which the lower extremity of the pin 10 is received and is provided with a flange that prevents the lower extremity of the pin 10 to leave the thoroughgoing bore.

The third valve member 24 is received axially displaceable inside the upper portion of the hollow second valve member 40. The second valve member 40 has an essentially annular body, i.e. like a hollow cylinder. The upper portion of the valve member 40 is received inside the annular portion of the first valve member 20. Thus, an annular portion of the second valve member 40 has an axial overlap with the annular portion of the first valve member 20. The overlapping portions of the first and second valve members 20, 40 can be penannular (forming an almost complete ring) instead of annular.

A helical wire spring 34 is disposed between the third valve member 24 and the second valve member 40. Hereto, the second valve member 40 is provided with a recess at its upper end in which a portion of the helical spring is received. The helical wire spring 34 urges the third valve member 24 upwards towards the pin 10 and the actuator 60.

An O-ring 36 seals the second valve member 40 to the inner wall of the valve housing 2 for dividing the valve housing 2 in an inlet part with a fluid pressure P1 corresponding to the pressure at the inlet 3 and an outlet part with a pressure P3 corresponding to the pressure at the outlet 4. A Pressure communication channel 5 communicates the pressure P1 at the inlet 3 to the bottom end of the valve housing 2.

Two seal securing parts 37 secure two seals 38 to the top of the second valve member 40 to enable a perfect seal between the second valve member 40 (and thus the housing 2) and the third valve member 24 controlled by the actuator 60. This enables the actuator 60 to close off the valve 1 completely, so that no leak can occur between the inlet 3 (P1) on one side and the middle part 8 (P2) and outlet 4 (P3) on the other side. In an embodiment P2 is the pressure downstream of the arrangement for adjusting the flow area and upstream of the arrangement for the differential pressure regulation.

An axially displaceable diaphragm guide 46 has a hollow upwardly projecting stem in which a downwardly projecting guiding shaft 50 of the second valve member 40 is received. The diaphragm guide 46 supports and guides a diaphragm 47 and the diaphragm 47 is secured to the diaphragm guide 46 by a snap ring 48. A helical wire spring 45 is disposed between the second valve member 40 and the diaphragm guide 46 to bias the diaphragm guide 46 in a downward direction as a countermeasure to the force respectively from P1, which influences the diaphragm 47 and diaphragm guide 46 in an upward direction and from P2, which influences the diaphragm 47 and diaphragm guide 46 in a downward direction. The exit openings 43 are distributed around the circumference of the second valve member 40 at an axial position that approximately corresponds to the axial range of the diaphragm 47. Thus, the arrangement including the diaphragm 47 and the exit openings 43 maintains an essentially constant differential pressure between the inlet pressure P1 and the intermediate pressure P2.

The diaphragm 47 closes the exit openings 43 to greater or lesser extent. The exit openings 43 are elongated openings with their greatest extent in the axial direction. A higher (higher as e.g. in FIGS. 4 and 5) position of the diaphragm 47 and diaphragm guide 46 results in a lesser extent of the elongated exit openings 43 being open and a lower position of the diaphragm 47 and diaphragm guide 46 results in a larger extent of the exit openings 43 being open.

The portion of the rotatable stem 12 that protrudes from the valve housing 2 is configured to be engaged by a detachable handle or key 70. Hereto, the upper portion of the valve stem 12 is provided with a noncircular cross-section, in an embodiment this is a squared cross-sectional shape that matches a key 70 with a recess with a squared cross-sectional shape.

The first rotatable valve member 20 is provided with an oblong first through-flow opening 25 in its annular or penannular part. The circumferential extent of the first through-flow opening 25 is in this example embodiment approximately 180° but could be lesser or more in other embodiments. A reinforcing rib 35 extends across the first through-flow opening 25 in order to reinforce and stabilize the first valve member 20.

The first valve member 20 is further provided with a semi-annular recess 29 that is achieved by a reduced axial extent section of the annular portion. The semi-annular recess 29 has a circumferential extent of approximately 180° but could in other embodiments have a lesser or wider circumferential extent.

The axially displaceable third valve member 24 can be provided with radial reinforcement ribs 33 that attach to a central shaft 30 and with a first semi-annular control edge 26 and a second semi-annular control edge 27 that is axially displaced relative to the first control edge 26 to a degree that corresponds to the axial offset between the first through-flow opening 25 and the recess 29. This is achieved by the axial extent of the annular or penannular portion of the third valve member 24 having a larger axial extent than the axial extent of a semi-annular portion of the third valve member 24.

The stationary second valve member 40 is provided with an oblong first through-flow opening 41 and oblong second through-flow opening 42 that is axially offset relative to the first through-flow opening 41 to a degree that corresponds to the axial offset between the first through-flow opening 25 and the recess 29.

The circumferential extent of the first through-flow opening 41 and of the second through-flow opening 42 is in this example embodiment almost 180° but could be lesser or more in other embodiments. The first through-flow opening 41 is provided with a reinforcing rib 39 and the second through-opening 42 is provided with a reinforcing rib 13.

The first through-flow opening 25 in the first valve member 20 and the first through-flow opening 41 in the second valve member 40 overlap completely in the axial direction and have a preferably substantially identical axial extent.

When the rotational position of the first valve member 20 relative to the second valve member 40 is in an extreme position there is no overlap between the first through-flow opening 25 in the first valve member 20 and the first through-flow opening 41 in the second valve member 40. In this extreme rotational position of the first valve member 20 relative to the second valve member 40 there is no overlap either between the recess 29 in the first valve member 20 and the second through-flow opening 42 in the second valve member 40 either. Thus, in this extreme position control valve 1 is essentially closed for through-flow and this is indicated by the rotatable marker 15 indicating position "1" on the fixed angular scale 16.

When the rotational position of the first valve member 20 relative to the second valve member 40 is moved to an intermediate position there is an overlap between the first through-flow opening 25 in the first valve member 20 and the first through-flow opening 41 in the second valve member 40 that results in a first entry opening with a circumferential extent equal to half the circumferential extent of the first through-flow opening 41, i.e. approximately 90° In this intermediate rotational position of the first valve member 20 relative to the second valve member 40 there is an overlap between the recess 29 in the first valve member 20 and the second through-flow opening 42 in the second valve member 40 that results in a second entry opening with a circumferential extent equal to half the circumferential extent of the second through-flow opening 42, i.e. approximately 90°.

When the rotational position of the first valve member 20 relative to the second valve member 40 is at its other extreme position a complete overlap between the first through-flow opening 25 in the first valve member 20 and the first through-flow opening 41 in the second valve member 40. This results in an entry opening with a circumferential extent equal to the circumferential extent of the first through-flow opening 41, i.e. approximately 180°. In this extreme rotational position of the first valve member 20 relative to the second valve member 40 there is a complete overlap between the recess 29 in the first valve member 20 and the second through-flow opening 42 in the second valve member 40. This results in an entry opening 53 with a circumferential extent equal to the circumferential extent of the second through-flow opening 42, i.e. approximately 180°. In this rotational position of the first valve member 20 the openings formed by the overlap in the through-flow openings in the first and second valve members 20, 40 are preset to their maximum possible flow-through area. This is reflected by the rotatable marker 15 indicating position "5", i.e. the fully open position with the control valve 1 being set to its highest maximum flow range.

The control valve 1 is in an embodiment a self-balancing dynamic flow control valve that is pressure independent, with an actuator 60 that is controlled by an input signal or by ambient temperature. The amount of liquid flowing through the control valve 1 is determined by an adjustable throttling element, which is in an embodiment formed as an adjustable orifice formed by the inlets created by the overlap between the first, second and third valve members 20,40,24.

The angular position of the rotatable first valve member 20 determines the maximum flow area of the adjustable orifice as formed by the two entry openings. The position of the rotatable first valve member 20 and thus of the valve stem 12 has to be set accurately so the operator knows exactly the maximum flow for the chosen setting.

The position of an axially displaceable shaft or pin 10 that is concentric with the valve stem 12 and protrudes from the valve stem 12 determines the axial flow area of the throttling element/adjustable orifice in the control valve 1 between a minimum value and the maximum set value determined by the position of the rotatable third valve member 20.

The axially displaceable pin 10 is operably connected to the actuator 60 so that the position of the axially displaceable pin 10 and the third valve member can be controlled with a control signal to the actuator 60, or by ambient temperature.

The maximum flow area is manually set by an operator when the actuator 60 is dismounted from the control valve 1 and the valve stem 12 can be accessed. The shape and size of the valve stem 12 and the torque required to rotate the valve stem 12 is such that it is not possible for an operator to adjust the position of the rotatable valve member 20 without the use of a suitable tool. For this purpose a detachable handle or key (not shown) is provided. The detachable key 70 is detachably coupled to the valve stem 12 and the key provides an operator with enough leverage to adjust the position of the rotatable valve member 20.

In operation, fluid, such as cold or warm water arrives at the inlet 3 with a pressure level P1. This water flows through the two entry openings defined by the overlap between the through-flow openings 25,41,42 and recess 29 into the pressure chamber 8 of the control valve 1. The two openings act as a restriction and therefore the pressure P2 in the pressure chamber 8 of the control valve 1 is lower than pressure P1. The pressure of the liquid in the pressure chamber 8 of the control valve urges the diaphragm 47 downwards, together with the helical wire spring 45. Pressure P1 is communicated via the pressure communication channel 5 to the opposite side of the diaphragm 47 and urges the diaphragm 47 upwards. The balance of these forces determines the position of the diaphragm 47 and thereby the differential pressure across the entry openings. Since the diaphragm 47 and the exit openings 43 act as a restriction to the flow the pressure P3 in the outlet 4 is generally lower than pressure P2.

When the axially movable valve member 24 is pressed completely downwards, e.g. by the linear actuator 60 and abuts with the seal 38 the flow regulator is completely closed. This will eventually cause the pressure P2 in the pressure chamber 8 to adopt the pressure P3 at the outlet 4. Since the inlet pressure P1 is much higher than the pressure P2 the diaphragm guide 46 and the diaphragm 47 will be urged upwards against the force of the spring 47 thereby closing the exit openings 43. However, when the exit openings 43 are practically closed by the diaphragm 47, the remaining liquid in the pressure chamber 8 is trapped. A drain passage 54 that connects the pressure chamber 8 to the outlet 4 allows the excessive liquid in the pressure chamber 8 to drain to the outlet 4. This allows simultaneously closing of the exit openings by the third valve member and of the openings 43 by the diaphragm 47. In an embodiment the drain passage 54 includes one or more grooves that are provided on the inner wall of the second valve member 40. In an embodiment, the groove 54 extends axially and one end of the groove connects to one of the exit openings 43, preferably at the upper end of the exit opening. Thus, a drain passage 54 is established by the groove and the associated exit opening 43.

Figure 10:
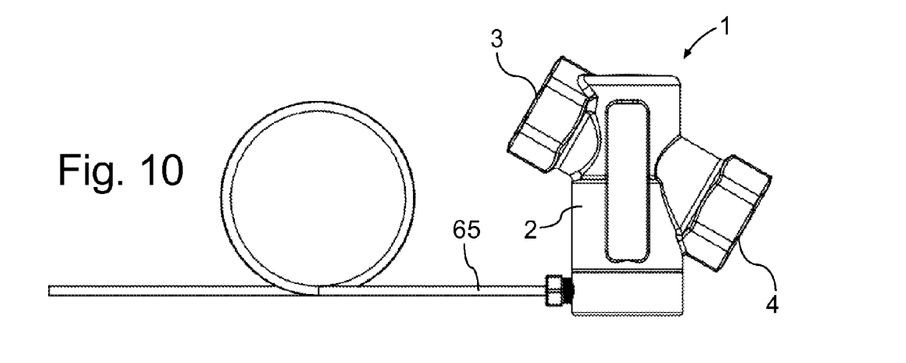
Figure 11:
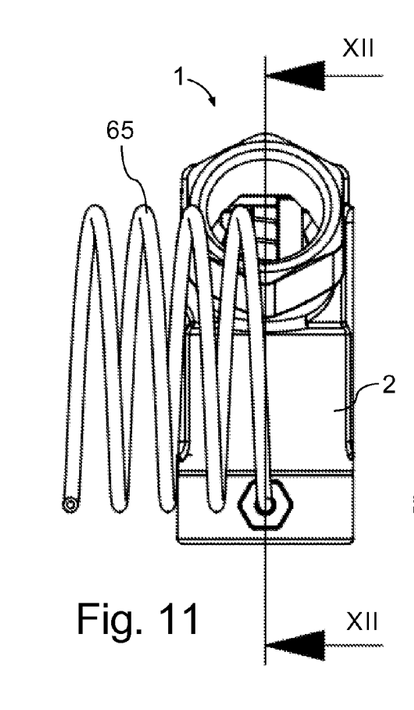
Figure 12:
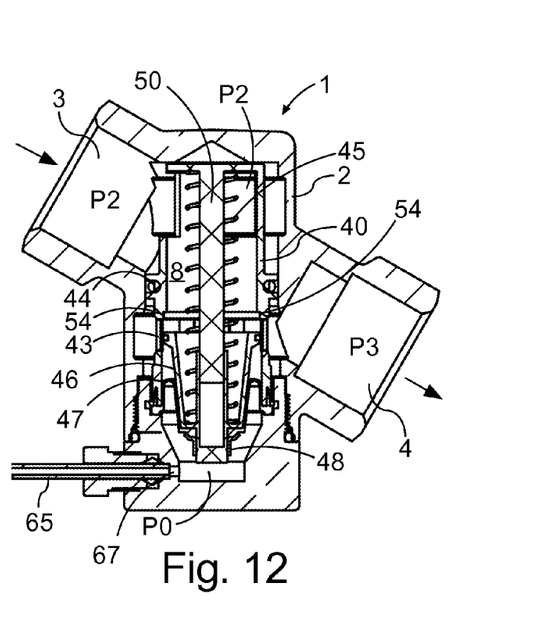
FIG. 12 is a sectional view of the valve in FIG. 11.

FIGS. 10 to 12 illustrate another example embodiment of a control valve 1. The control valve 1 according to this embodiment differs from the valves shown above in that it does not include an arrangement for adjusting the flow area of an entry opening. Instead, the valve 1 according to this embodiment is intended to be arranged down streams of at least one valve (not shown) that is capable of adjusting a flow area (including a closed position) or can be an on/off type valve.

The valve 1 has a housing 2 that is very similar to the housing of the valves according to the embodiments above and is provided with an inlet 3 and an outlet 4. Arrows in FIG. 12 illustrates the direction of the flow into the inlet 3 and from the outlet 4.

The housing 2 is also provided with a control port 67. In the drawings a control conduit 65 is connected to the control port 67. The control port 67 serves to provide the valve 1 with a control pressure P0. Inside the housing 2, the valve 1 is provided with a pressure regulating arrangement downstream of the inlet 3 and downstream of a pressure chamber 8 in the hollow of the valve 1. In an embodiment the pressure chamber and the pressure regulating arrangement are at least partially formed by and arranged in an annular valve member 40. The pressure of the liquid in the pressure chamber 8 is referred to as intermediate pressure P2. The pressure regulating arrangement includes a rolling diaphragm 47 that is supported by a diaphragm guide 46. The guide 46 and the rolling diaphragm are axially movable inside the valve 1.

The axially displaceable diaphragm guide 46 has a hollow upwardly projecting (upwardly according to FIG. 12) stem in which a downwardly projecting guiding shaft 50 is received. The diaphragm guide 46 supports and guides a diaphragm 47 and the diaphragm 47 is secured to the diaphragm guide 46 by a snap ring 48. A helical wire spring 45 is disposed between the top of the housing and the diaphragm guide 46. In operation, fluid, such as cold or warm water arrives at the inlet 3 and flows into the pressure chamber 8 of the valve 1 with a pressure level P2. The pressure of the liquid in the pressure chamber 8 of the control valve urges the diaphragm 47 downwards, together with the helical wire spring 45. Pressure P0 is communicated via the control port 67 to the opposite side of the diaphragm 47 and urges the diaphragm 47 upwards. The balance of these forces determines the position of the diaphragm 47 and thereby the differential pressure between P0 and P2. Since the diaphragm guide 46 and the exit openings 43 act as a restriction to the flow the pressure P3 in the outlet 4 is generally lower than pressure P2. Exit openings 43 are distributed around the circumference of the second valve member 40 at an axial position that approximately corresponds to the axial range of the diaphragm 47. Thus, the arrangement including the diaphragm 47 and the exit openings 43 maintains an essentially constant differential pressure between the control pressure P0 and the intermediate pressure P2.

The diaphragm guide 46 closes the exit openings to greater or lesser extent. A higher (higher as e.g. in FIG. 12) position of the diaphragm 47 and diaphragm guide 46 results in a lesser extent of the exit openings 43 being open and a lower position of the diaphragm 47 and diaphragm guide 46 results in a larger extent of the exit openings 43 being open.

When the valve/valves (not shown) upstream of the control valve 1 closes off the flow this will eventually cause the pressure P2 in the pressure chamber 8 to adopt the pressure P3 at the outlet 4. Since the control pressure P0 is much higher than the pressure P2 the diaphragm guide 46 and the diaphragm 47 will be urged upwards against the force of the spring 47 thereby closing the exit openings 43. However, when the exit openings 43 are practically closed by the diaphragm 47, the remaining liquid between the closed off valve/valves upstream of the control valve 1 to the pressure regulation arrangement is trapped. A drain passage 54 that connects the pressure chamber 8 to the outlet 4 allows the excessive liquid between the closed off valve/valves and the pressure regulation arrangement to drain to the outlet 4. This allows simultaneously closing of the exit openings by the upstream valve and of the exit openings 43 by the diaphragm guide 46. In the shown embodiment the drain passage is formed by at least one through going slit 54 that connect the pressure chamber 8 to the outlet 4. In an embodiment the drain passage 54 includes one or more grooves that are provided on the inner wall of the annular valve member 40. In an embodiment, the groove 54 extends axially and one end of the groove connects to one of the exit openings 43, preferably at the upper end of the exit opening. Thus, a drain passage 54 is established by the groove and the associated exit opening.

The control valve 1 according may in an embodiment comprise means to manually adjust the characteristics of the resilient member 45 in order to change the controlled differential pressure between the connection pressure P0 at the control port 67 and the intermediate pressure P2 in the pressure chamber 8.

As such, those skilled in the art will appreciate that the conception upon which this invention is based may readily be utilized as a basis for the designing of other structures, methods and systems for carrying out the several purposes of the present invention. It is important, therefore, that the claims be regarded as including such equivalent constructions insofar as they do not depart from the scope of the present invention.

The term "comprising" as used in the claims does not exclude other elements or steps. The term "a" or "an" as used in the claims does not exclude a plurality.

The invention claimed is:

1. A control valve (1) for controlling liquid flow in a heating and/or cooling installation, the control valve (1) comprising:
 a valve housing (2) with an inlet (3) and an outlet (4),
 a flow area regulator for regulating a flow area of at least one variable size entry opening through which the liquid flowing through the control valve (1) from the inlet (3) to the outlet (4) has to pass,
 the flow regulator comprising at least one valve member (20,24) that is movable between a fully open position that corresponds to a largest possible flow area of the entry opening and a fully closed position that corresponds to the smallest possible flow area of the entry opening, in which said entry opening is essentially closed,
 a pressure regulating arrangement downstream of the flow area regulator with a pressure chamber (8) downstream of the flow area regulator and upstream of the pressure regulating arrangement,
 said pressure regulating arrangement being configured for maintaining an essentially constant differential pressure between the inlet pressure (P1) in the inlet (3) and the intermediate pressure (P2) in the pressure chamber (8),
 said pressure regulating arrangement comprising a movable throttle member (47) that cooperates with a plurality of exit openings (43), said movable throttle member (47) substantially closes said exit openings (43) in one of its positions, characterized by comprising at least one drain passage (54) connecting the pressure chamber (8) to the outlet (4) with the drain passage (54) still allowing liquid in the pressure chamber (8) to drain to the outlet (4) when said movable throttle member (47) is in said position where it closes said exit openings (43).

2. A control valve (1) according to claim 1, wherein said movable throttle member is urged by the inlet pressure (P1) to increase the flow resistance posed by the pressure regulating arrangement and is urged by a resilient member and by the intermediate pressure (P2) to decrease the flow resistance posed by the pressure regulating arrangement.

3. A control valve (1) according to claim 1, wherein the movable throttle member comprises a rolling diaphragm (47) that cooperates with said plurality of exit openings (43).

4. A control valve (1) according to claim 3, further comprising an annular valve member (40) in which the rolling diaphragm (47) is received, the annular valve member (40) at least partially defining the pressure chamber (8), and the exit openings (43) being provided in the annular valve member (40) circumferentially distributed around the circumference of the annular valve member (40).

5. A control valve (1) according to claim 3, wherein the drain passage (54) connects to the outlet (4) via one or more of the exit openings (43).

6. A control valve (1) according to claim 3, wherein the rolling diagram (47) substantially closes the exit holes (43) in a position of the rolling diagram with the drain passage (54) still allowing liquid in the pressure chamber (8) to drain to the outlet (4).

7. A control valve (1) according to claim 4, wherein the drain passage includes at least one groove (54) in the inner wall of the annular valve member (40), the at least one groove preferably connecting to one of the exit openings (43).

8. A control valve (1) according to claim 4, wherein the exit openings (43) are elongated holes though the annular valve member (40), and wherein the at least one drain passage (54) is a substantially axially extending groove (54) in the inner wall of the annular valve member (40) that connects to one of the exit openings (43).

9. A control valve (1) according to claim 4, further comprising a rotatable and/or axially displaceable valve member (20, 24) that cooperates with the annular valve member (40) to define- and regulate the size of the flow area of the entry opening.

10. A control valve (1) according to of claim 4, wherein a rotatable valve member (20) is configured to adjust the circumferential extent of the entry opening in cooperation with the annular valve member (40).

11. A control valve (1) according to claim 9, wherein an axially displaceable valve member (24) is configured to adjust the axial extent of the entry opening in cooperation with the annular valve member (40) and/or with the rotatable valve member (20).

12. A control valve (1) according to claim 9, wherein the rotatable valve member (20) is configured to be manually adjusted in its rotational position.

13. A control valve (1) according to claim 9, wherein the axially displaceable valve member (24) is configured to be adjusted in its axial position by an actuator (60).

14. A control valve (1) according to claim 9, wherein the axially displaceable valve member (24) comprises at least one control edge (26,27).

15. A control valve (1) according to claim 1, wherein the rotatable valve member (20) is operably connected to an axial valve stem (12) so that rotation of the valve stem (12) results in rotation of the rotatable valve member (20) and the valve (1) has a marker (15) and an angular scale (16) being configured to indicate the position of the first valve member (20).

16. A control valve (1) for controlling liquid flow in a heating and/or cooling installation, the control valve (1) comprising:

a valve housing (2) with an inlet (3) and an outlet (4), a flow area regulator for regulating a flow area of at least one variable size entry opening through which the liquid flowing through the control valve (1) from the inlet (3) to the outlet (4) has to pass, the flow regulator comprising at least one valve member (20,24) that is movable between a fully open position that corresponds to a largest possible flow area of the entry opening and a fully closed position that corresponds to the smallest possible flow area of the entry opening, in which said entry opening is essentially closed, a pressure regulating arrangement downstream of the flow area regulator with a pressure chamber (8) downstream of the flow area regulator and upstream of the pressure regulating arrangement, said pressure regulating arrangement being configured for maintaining an essentially constant differential pressure between the inlet pressure (P1) in the inlet (3) and the intermediate pressure (P2) in the pressure chamber (8), said pressure regulating arrangement comprising a movable throttle member (47) that cooperates with a plurality of exit openings (43), said movable throttle member (47) substantially closes said exit openings (43) in one of its positions, characterized by comprising at least one drain passage (54) connecting the pressure chamber (8) to the outlet (4) with the drain passage (54) still allowing liquid in the pressure chamber (8) to drain to the outlet (4) when said movable throttle member (47) is in said position where it closes said exit openings (43), said drain passage (54) connecting to the outlet (4) via one or more of the exit openings (43).

17. A control valve (1) for controlling liquid flow in a heating and/or cooling installation, the control valve (1) comprising:

a valve housing (2) with an inlet (3) and an outlet (4), a flow area regulator for regulating a flow area of at least one variable size entry opening through which the liquid flowing through the control valve (1) from the inlet (3) to the outlet (4) has to pass, the flow regulator comprising at least one valve member (20,24) that is movable between a fully open position that corresponds to a largest possible flow area of the entry opening and a fully closed position that corresponds to the smallest possible flow area of the entry opening, in which said entry opening is essentially closed, a pressure regulating arrangement downstream of the flow area regulator with a pressure chamber (8) downstream of the flow area regulator and upstream of the pressure regulating arrangement, said pressure regulating arrangement being configured for maintaining an essentially constant differential pressure between the inlet pressure (P1) in the inlet (3) and the intermediate pressure (P2) in the pressure chamber (8), said pressure regulating arrangement comprising a movable throttle member (47) that cooperates with a plurality of exit openings (43), said movable throttle member (47) substantially closes said exit openings (43) in one of its positions, characterized by comprising at least one drain passage (54) connecting the pressure chamber (8) to the outlet (4) with the drain passage (54) still allowing liquid in the pressure chamber (8) to drain to the outlet (4) when said movable throttle member (47) is in said position where it closes said exit openings (43), said movable throttle member comprising a rolling diaphragm (47) that cooperates with said plurality of exit openings (43), and said rolling diaphragm (47) substantially closing the exit holes (43) in a position of the rolling diaphragm with the drain passage (54) still allowing liquid in the pressure chamber (8) to drain to the outlet (4).

* * * * *